United States Patent
Merritt (10) Patent No.: US 7,959,701 B2
(45) Date of Patent: Jun. 14, 2011

(54) FILTER AND METHOD

(75) Inventor: Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 305 days.

(21) Appl. No.: 11/624,921

(22) Filed: Jan. 19, 2007

(65) Prior Publication Data

US 2007/0169449 A1    Jul. 26, 2007

Related U.S. Application Data

(60) Provisional application No. 60/761,203, filed on Jan. 23, 2006.

(51) Int. Cl.
*B01D 46/00* (2006.01)

(52) U.S. Cl. ............... 55/499; 55/498; 55/503; 55/520; 55/521

(58) Field of Classification Search .............. 55/486, 55/498, 502, 521, 520, 524, 499, 501
See application file for complete search history.

(56) References Cited

U.S. PATENT DOCUMENTS

| | | | | | |
|---|---|---|---|---|---|
| 2,915,426 | A | * | 12/1959 | Poelman | 156/178 |
| 3,042,571 | A | | 7/1962 | Jackson | |
| 4,486,206 | A | * | 12/1984 | Miyakawa et al. | 55/337 |
| 4,498,989 | A | * | 2/1985 | Miyakawa et al. | 210/450 |
| 4,619,675 | A | * | 10/1986 | Watanabe | 55/498 |
| 6,179,890 | B1 | * | 1/2001 | Ramos et al. | 55/482 |
| 6,190,432 | B1 | | 2/2001 | Gieseke et al. | |
| 6,350,291 | B1 | | 2/2002 | Gieseke et al. | |
| 6,485,544 | B1 | * | 11/2002 | Ziske | 95/273 |
| 6,517,598 | B2 | * | 2/2003 | Anderson et al. | 55/498 |
| 6,547,857 | B2 | * | 4/2003 | Gieseke et al. | 95/273 |
| 6,610,117 | B2 | | 8/2003 | Gieseke et al. | |
| 6,610,126 | B2 | * | 8/2003 | Xu et al. | 95/273 |
| 6,746,518 | B2 | * | 6/2004 | Gieseke et al. | 95/273 |
| 6,783,565 | B2 | * | 8/2004 | Gieseke et al. | 55/385.3 |
| 6,852,141 | B2 | * | 2/2005 | Bishop et al. | 55/385.3 |
| 6,878,190 | B1 | * | 4/2005 | Xu et al. | 95/273 |
| 6,997,968 | B2 | * | 2/2006 | Xu et al. | 55/495 |
| 7,001,450 | B2 | * | 2/2006 | Gieseke et al. | 95/273 |
| 7,211,124 | B2 | * | 5/2007 | Gieseke et al. | 55/357 |

(Continued)

FOREIGN PATENT DOCUMENTS

DE    199 50 067 A1    4/2001

(Continued)

OTHER PUBLICATIONS

YourDictionary.com web page showing definition of "couple", date unknown.*

*Primary Examiner* — Robert A Clemente
(74) *Attorney, Agent, or Firm* — Leydig, Voit & Mayer, Ltd.

(57) ABSTRACT

A fluted filter element may include one or more bridging elements to provide resistance to telescoping of the layers of the fluted filter element. The bridging elements are attached to one or both of the filter faces via adhesives, and/or mechanical means, and may also take the form of one or more beads of adhesive applied across one or both ends of the filter element. The adhesive beads may include a flexible element, such as a string, or strip of material embedded in the adhesive bead.

76 Claims, 6 Drawing Sheets

U.S. PATENT DOCUMENTS

| | | | |
|---|---|---|---|
| 7,235,115 B2 * | 6/2007 | Duffy et al. | 55/497 |
| 7,393,375 B2 * | 7/2008 | Xu et al. | 55/495 |
| 7,396,375 B2 * | 7/2008 | Nepsund et al. | 55/481 |
| 7,481,863 B2 * | 1/2009 | Oelpke et al. | 55/521 |
| 2006/0081528 A1 * | 4/2006 | Oelpke et al. | 210/493.1 |

FOREIGN PATENT DOCUMENTS

| | | |
|---|---|---|
| EP | 0 581 695 A1 | 2/1994 |
| EP | 1 214 962 A1 | 6/2002 |
| WO | WO 2004/009215 A1 | 1/2004 |
| WO | WO 2004/082795 A2 | 9/2004 |

* cited by examiner

FILTER AND METHOD

CROSS-REFERENCE TO RELATED APPLICATIONS

This patent application claims the benefit of U.S. Provisional Patent Application No. 60/761,203, filed Jan. 23, 2006, which is incorporated by reference in its entirety herein.

FIELD OF THE INVENTION

This invention relates to fluid filters, and more particularly to the construction and use of filter elements having alternating layers of a face sheet material and a corrugated filter material, with the alternating layers forming substantially longitudinally oriented flutes for passage of a fluid to be filtered.

BACKGROUND OF THE INVENTION

Filter apparatuses of the type used for filtering particulate matter from fluid sometimes include a filter housing having an inlet for receiving the fluid with entrained particulate matter, and an outlet for delivering filtered fluid to a device needing fluid that is free of particulate matter. For example, a filter may be provided at the air inlet of an engine or an air compressor to remove dust, water, or other particulate matter that could cause damage to the engine or compressor if it were not removed from the air entering the engine or compressor.

In such filters, the bulk of the particulate matter is typically removed by a filter element that is installed within the filter housing in such a manner that the fluid must flow through the filter element, in traveling from the inlet to the outlet of the filter. The filter element typically includes a filter pack of porous filter material, which removes particulate matter from the fluid. Over time, the filter pack of the filter element becomes plugged or coated with particulate matter, necessitating removal and replacement of the filter element, in order for the filter element to continue in its function of supplying particulate-free fluid at the outlet of the filter.

A seal arrangement is provided at a juncture of the filter element in the housing, so that the fluid to be filtered cannot bypass the filter element while passing through the filter. Specifically, in one commonly utilized prior approach to providing a fluid filter, the filter element includes a media pack, a mounting flange attached to the inlet end of the media pack, and a seal support frame, which includes an annular axial extension thereof that projects axially from the outlet end of the media pack for supporting a seal. The seal is configured to seal radially and/or axially against the inner surface of the housing.

The seal support frame, of such prior filter apparatuses, typically includes integral webs extending completely across the outlet end of the media pack. These webs are sometimes provided for the purpose of resisting pressure forces acting on the media pack, which could cause the center of the media pack to bow outward in a downstream direction. It is heretofore been believed, by those having skill in the art, that such seal support frames having integral webs extending completely across the outlet face of the media pack were particularly necessary in media packs formed by stacking or coiling layers of corrugated filter material for a so-called "fluted filter," in order to prevent the center of the filter media pack from telescoping in a downward direction under maximum rated inlet fluid pressure, particularly where the media pack is saturated with dirt or moisture. U.S. Pat. Nos. 6,190,432 and 6,610,117 to Gieseke, et al. disclose filter packs having seals attached to axially extending annular portions of a seal support frame which includes integral webs extending completely across the face of a media pack.

Having the seal mounted on an axially extending annular extension of a seal support frame, as has been done in the past, together with the space occupied by the webs at the outlet end of the filter pack, undesirably consume a significant portion of the volume inside of the housing, and in some instances cause the housing to be larger than it would have to be if the webbed, axially extending, seal support frame could be eliminated.

It is desirable, therefore, to provide an improved filter element, and filter apparatus in a form which better utilizes the volume inside of the cavity of the filter housing, while still providing means for precluding telescoping of the filter element.

BRIEF SUMMARY OF THE INVENTION

The invention provides an improved filter element and filter apparatus, through use of a filter element having alternating layers of a face sheet material and a corrugated filter material, with the alternating layers forming substantially longitudinally oriented flutes that extend axially from a first end to a second end of the filter element, with the filter element further having one or more bridging elements attached directly to either or both of the first and second end of the filter element and joining adjacent layers of the filter element together. The bridging element provides resistance to telescoping of the layers of the filter element when the filter element is subjected to operating pressure differentials.

The bridging elements are attached to one or both of the filter faces via adhesives, and/or mechanical means.

In one form of the invention, one or more beads of adhesive are applied across one or both ends of the filter element. The adhesive may be any appropriate adhesive for use in the operating environment, including, for example, hot melt adhesives, or single or multiple part urethanes or epoxy.

In some forms of the invention, a bridging element may include a flexible element, such as a string, or strip of material embedded in an adhesive bead. The strip of material may take a variety of appropriate forms, including an amorphous, multiple parallel or twisted strands. Multiple separate strings or flexible elements may also be embedded in a common adhesive bead.

In other forms of the invention, the bridging element includes a rigid supporting part attached directly to one or both ends of the filter element. The rigid supporting part may be held in place by beads of adhesive applied beneath, or encapsulating the rigid supporting part. The rigid supporting part may include features such as outwardly extending posts, tabs, barbs, or other appropriate mechanical features for retaining the rigid supporting part on one of the ends of the filter element. For example, a rigid supporting part may take the form of a molded plastic cross, or web-like structure attached to an end of the filter element by beads of adhesive. Mechanical attachment features, such as barbed posts, may also be used for attaching the rigid supporting part to an end of the filter element. In embodiments of the invention utilizing a rigid supporting part with mechanical attachment features, the rigid supporting part may also be attached to an end of the filter element by an adhesive, in addition to the mechanical attachment features.

The invention may also take the form of a method for improving resistance of a fluted filter element to telescoping, through attachment of a bridging element, according to the invention, to one or both ends of the filter element.

Other aspects, objectives, and advantages of the invention will be apparent from the following detailed description and the accompanying drawings.

While the invention will be described in connection with certain embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
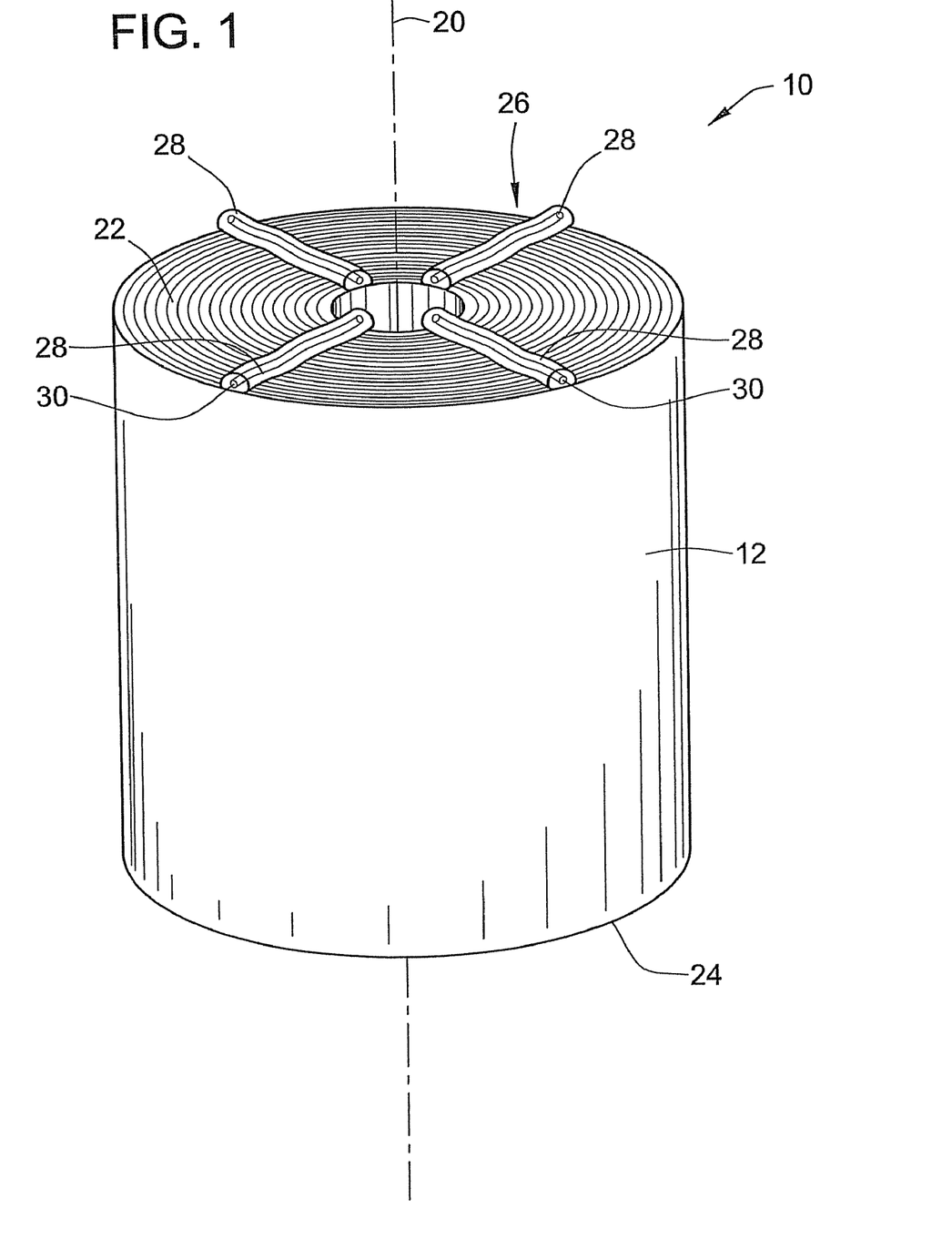
FIG. 1 is a perspective illustration of an exemplary embodiment of a filter element, according the invention, including a bridging element extending across one of the end faces of the filter element.
Figure 2:
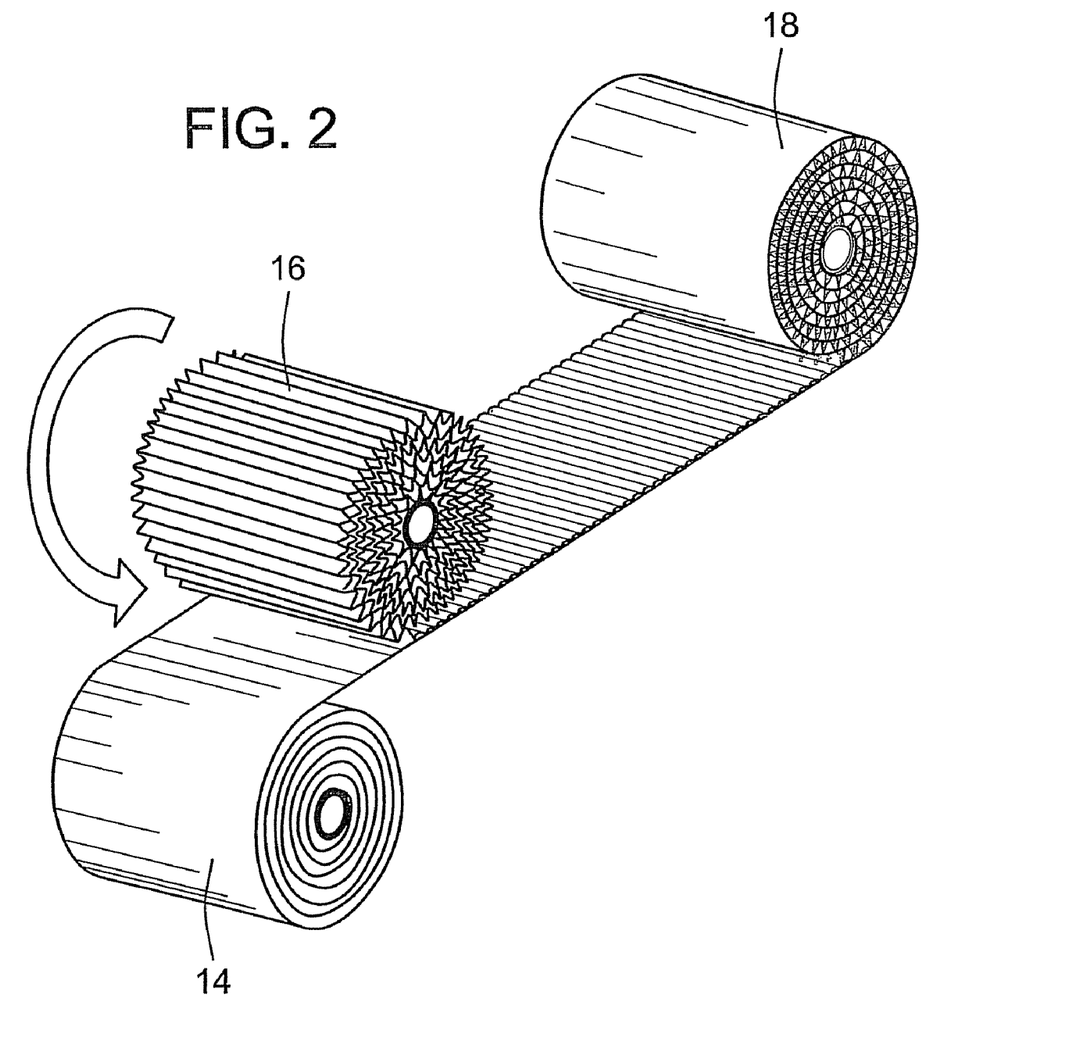
FIG. 2 is a perspective, schematic, illustration of the manner of forming a fluted filter medium according to the invention.

FIG. 1 shows a first exemplary embodiment of the invention in the form of a filter element 10 having a media pack 12. Referring to FIG. 2, the media pack is formed from a coil of alternating face sheets 14 and corrugated sheets 16 joined together to form a coil 18 of fluted filter material.

As shown in FIG. 1, the media pack 12 is wound around a longitudinal axis 20, with the media pack 12 extending from a first end 22 to a second end 24 of the filter element 10. It is noted that although the first and second ends 22, 24 of the filter element 10 of the exemplary embodiment are substantially flat and axially facing, in other embodiments of the invention, one or both of the first and second ends 22, 24 of the filter element 10 may take some other shape, such as rounded, spherical, conical, undulating, or other shapes appropriate to the design of the particular embodiment of the invention.

As shown in FIG. 1, the exemplary embodiment of the filter element 10 further includes a bridging element 26 having four beads of adhesive 28 extending across the first end 22 of the filter element 10, and joining adjacent layers of the media pack 12 together across the first end 22 of the filter element 10. In the exemplary embodiment shown in FIG. 1, the bridging element further includes strands of string 30 embedded in the beads of adhesive 28. In other embodiments of the invention, it may be desirable and appropriate to utilize the beads of adhesive 28 without the embedded strings 30.

It is noted, that although the exemplary embodiment of the filter element 10 shown in FIG. 1 includes a bridging element 26 attached to only the first end 22 of the filter element, in other embodiments of the invention a bridging element, according to the invention, may be attached to either or both of the first and second ends 22, 24 of the filter element 10.

Figure 3:
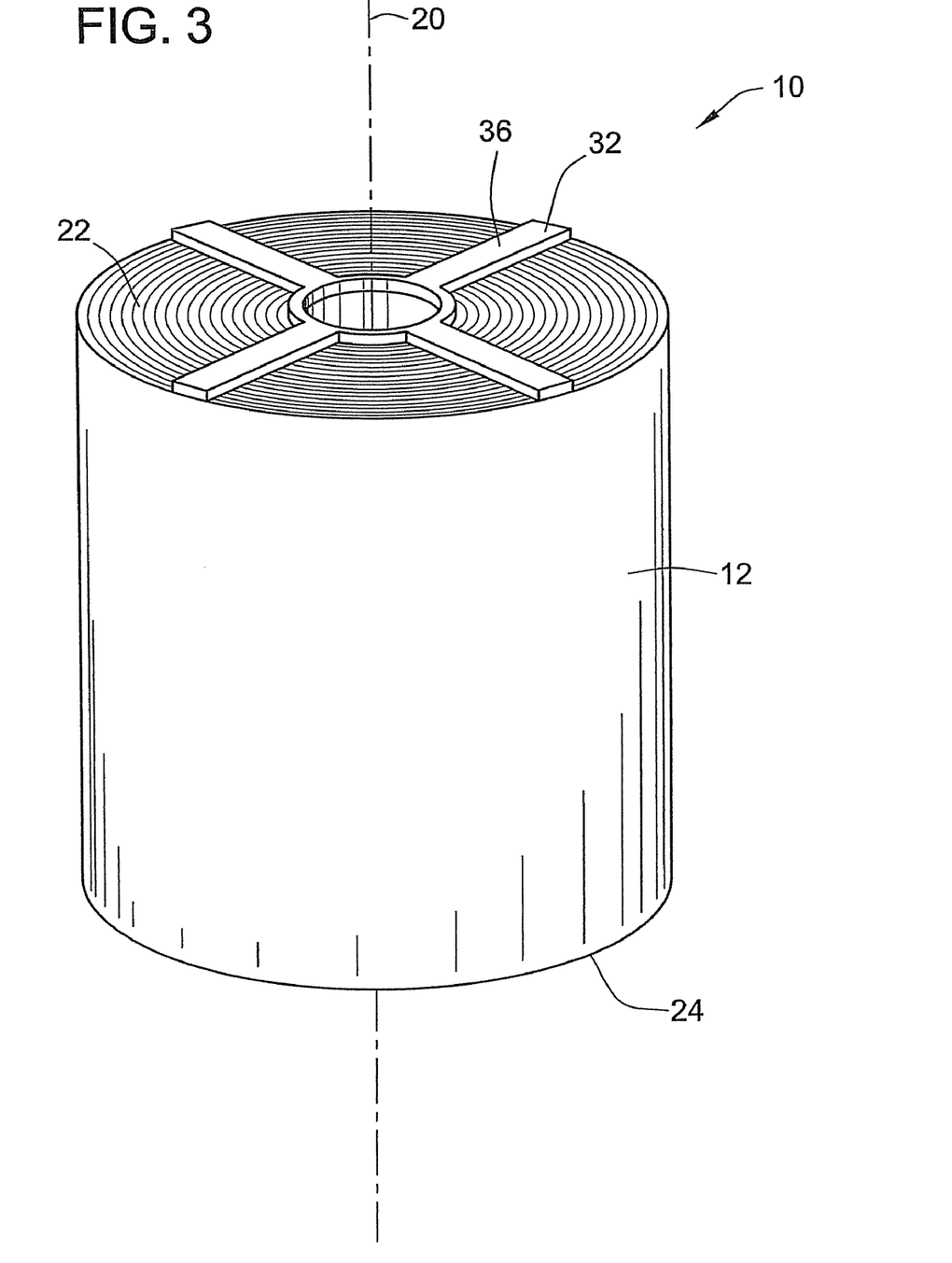
FIGS. 3 and 4 are perspective illustrations showing other embodiments of a filter element, according to the invention, including a bridging element having a rigid part extending across the face of the filter element.
Figure 4:
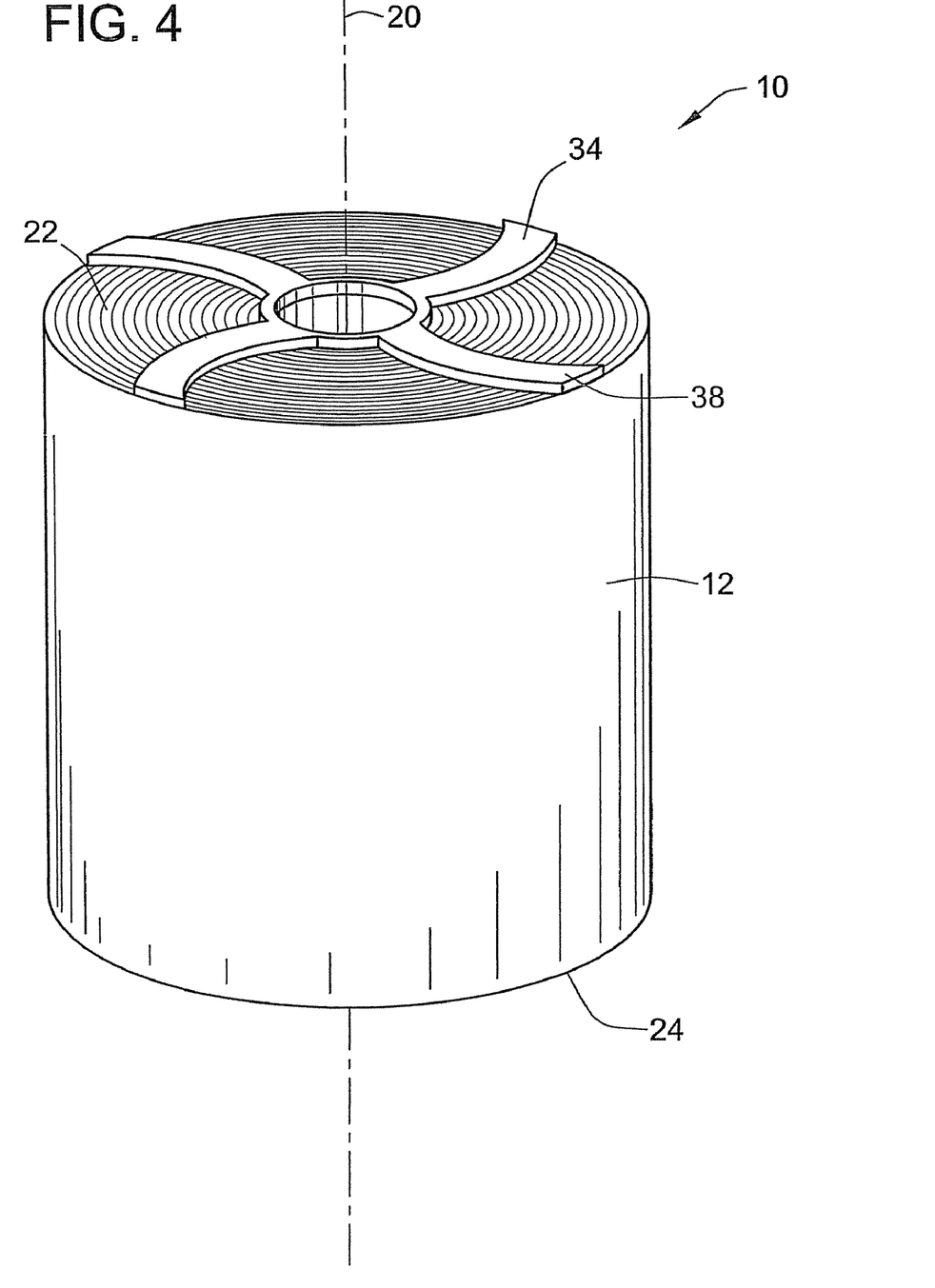

As shown in FIGS. 3 and 4, in other embodiments of the invention, bridging elements 32, 34 may included a rigid part 36, 38 attached directly to one or both of the first and second ends 22, 24 of the filter element 10. The rigid part may include straight legs extending across the end of the filter element, as shown in the rigid part 36 of FIG. 3, and in other embodiments of the invention, a rigid part 38, as shown in FIG. 4, may include legs which are curved. In other embodiments of the invention, rigid parts, according to the invention, may include a combination of straight or curved legs, or other shapes having portions thereof extending at least partially across an end 22, 24 of the filter element 10 to bridge and join together adjacent layers of the media pack 12.

In some embodiments of the invention, a bridging element, having a rigid part, such as those shown in FIGS. 3 and 4, may be joined to an end of the filter element 10 by an adhesive. The adhesive may be applied continuously or intermittently to a facing surface of the rigid part and/or the end of the filter element 10, or in some embodiments, may encapsulate all or portions of the rigid part 34, 36.

As shown in FIGS. 5A-5E, a rigid part 40 may also include a mechanical attachment 42 projecting from the remainder of the rigid part 40 for engaging open ends of the flutes at one of the first or second ends 22, 24 of the filter element. Such mechanical attachments 42 may be utilized with or without beads of adhesive in various embodiments of the invention. Preferably, however, such mechanical attachments 42 would generally be used in conjunction with either continuous or intermittent beads of adhesive in the same manner as described above in regard to the description of the embodiment shown in FIGS. 3 and 4.

Figure 5A:
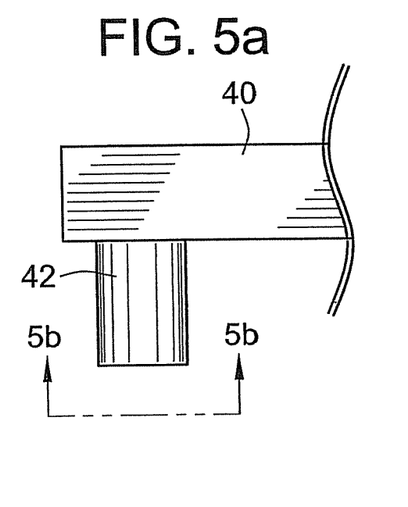
FIGS. 5A-5E are detailed illustrations of mechanical attachments extending from a rigid part, of a bridging element according to the invention, for rigid parts of the type shown in FIGS. 3 and 4.
Figure 5B:
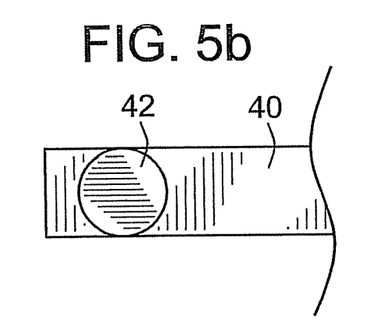
Figure 5C:
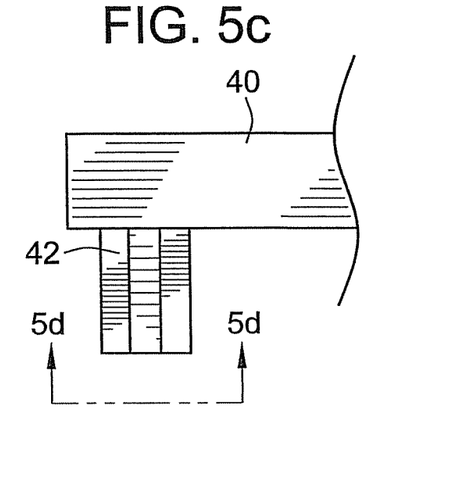
Figure 5D:
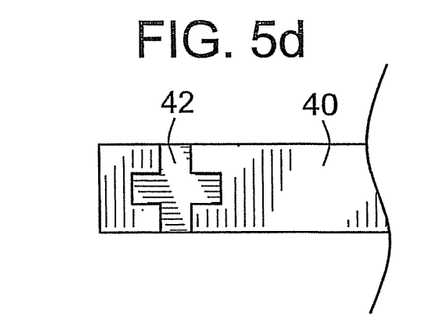
Figure 5E:
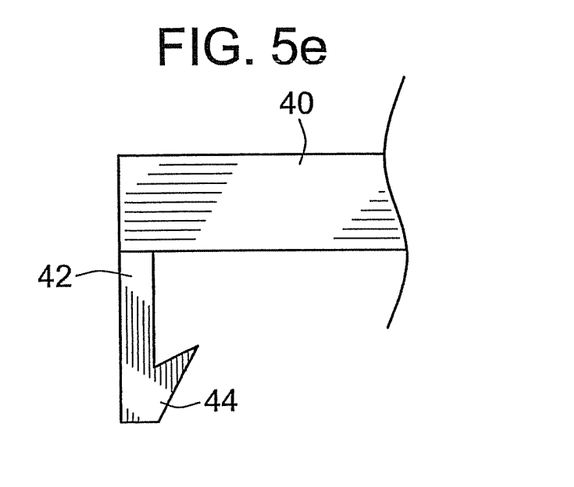

As will be understood, by those having skill in the art, the mechanical attachments 42 may take any appropriate form, such as the right circular cylindrical shaped posts shown in FIGS. 5A and 5B, the rectangular cross-shaped tabs 42 shown in FIGS. 5C and 5D, and may further include barbs 44, as shown in FIG. 5E.

Figure 6:
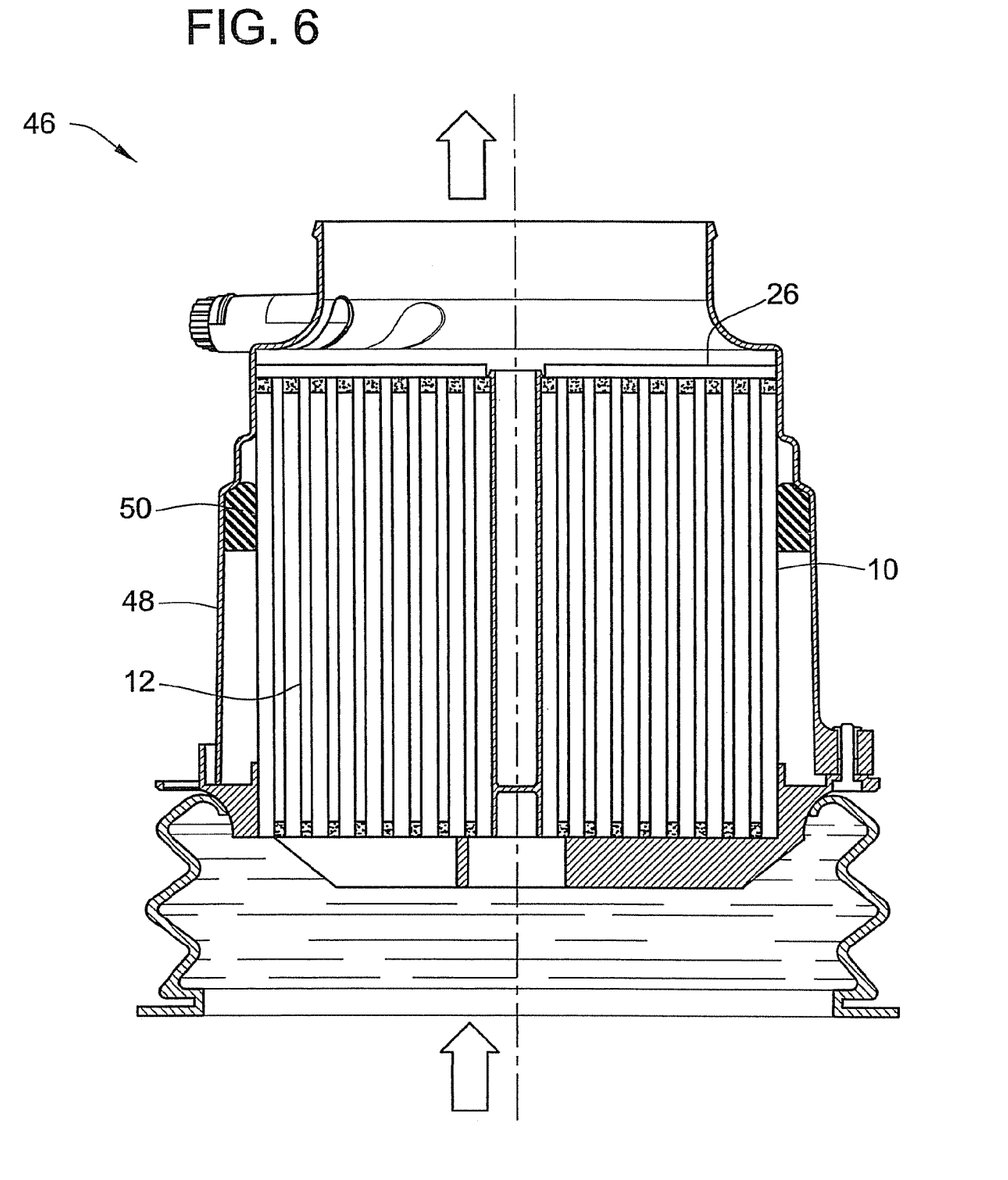
FIG. 6 shows an exemplary embodiment of a filter apparatus, according to the invention, including a filter element having a bridging element attached to one end thereof.

FIG. 6 shows an exemplary embodiment of a filter apparatus 46, according to the invention which includes a filter element 10, as described above, inserted into a filter housing 48, and sealed thereto by a seal member 50 which seals the juncture of the filter element 10 and the housing 48. By the use of a bridging element 26, according to the invention, a filter apparatus 46 is provided with a filter element 10 which is resistant to telescoping of the adjoining layers of the filter media pack 12 under pressure from the fluid flowing through the filter apparatus 46. The bridging element 26 avoids the unnecessary complexity and wastage of space within the housing 48 attendant to use of the seal support members having integral webs extending across the face of the filter element in filter apparatuses prior to the invention.

The invention may be practiced in the form of a method for providing additional resistance to telescoping of a filter element, and/or a method for constructing a filter element having improved resistance to telescoping.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor(s) for carrying out the invention. Variations of those preferred embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid filter element comprising:
   a plurality of adjacent layers including a filter material and having an end face, the plurality of adjacent layers are arranged in a coil such that the plurality of adjacent layers are concentrically disposed; and
   a bridging element coupled to the plurality of adjacent layers across the end face to join the plurality of adjacent layers and resist movement of the plurality of adjacent layers relative to one another, the bridging element is an adhesive.

2. The filter element of claim 1 wherein the adhesive is a bead of adhesive.

3. The filter element of claim 2 wherein the bead of adhesive includes a strip of material embedded therein.

4. The filter element of claim 3 wherein the strip of material is a string.

5. The filter element of claim 1 wherein the bridging element extends into the end face.

6. The filter element of claim 1 wherein the plurality of adjacent layers include a sheet material and a corrugated material.

7. The filter element of claim 6 wherein the plurality of adjacent layers alternate between the sheet material and the corrugated material.

8. The filter element of claim 1 in combination with a filter housing.

9. A method for improving resistance of a fluid filter element to telescoping, the method comprising: providing a filter element material; arranging the filter element material such that the filter element material comprises a plurality of adjacent layers, the plurality of adjacent layers are arranged in a coil such that the plurality of adjacent layers are concentrically disposed; providing a bridging element, the bridging element is an adhesive; and coupling the bridging element to an end face of the filter element such that the bridging element joins adjacent ones of the plurality of layers of the filter element to resist movement of adjacent layers relative to one another.

10. The method of claim 9 wherein the adhesive is a bead of adhesive.

11. The method of claim 10 wherein the bead of adhesive includes a strip of material embedded therein.

12. The method of claim 11 wherein the strip of material is a string.

13. The method of claim 9 wherein the plurality of adjacent layers include a sheet material and a corrugated material.

14. The method of claim 13 wherein the plurality of adjacent layers alternate between the sheet material and the corrugated material.

15. The method of claim 9 wherein the bridging elements extends into the end face.

16. The method of claim 9 in combination with providing a filter housing.

17. A fluid filter element comprising:
    a plurality of adjacent layers including a filter material and having an end face, the plurality of adjacent layers form substantially longitudinally oriented flutes that extend axially from a first end to a second end of the filter element; and
    a bridging element coupled to the plurality of adjacent layers across the end face to join the plurality of adjacent layers and resist movement of the plurality of adjacent layers relative to one another, the bridging element is an adhesive.

18. The filter element of claim 17 wherein the adhesive is a bead of adhesive.

19. The filter element of claim 18 wherein the bead of adhesive includes a strip of material embedded therein.

20. The filter element of claim 19 wherein the strip of material is a string.

21. The filter element of claim 17 wherein the plurality of adjacent layers include a sheet material and a corrugated material.

22. The filter element of claim 21 wherein the plurality of adjacent layers alternate between the sheet material and the corrugated material.

23. The filter element of claim 17 wherein the bridging element extends into the end face.

24. The filter element of claim 17 in combination with a filter housing.

25. A fluid filter element comprising:
    a plurality of adjacent layers including a filter material and having an end face, the plurality of adjacent layers are arranged in a coil such that the plurality of adjacent layers are concentrically disposed; and
    a bridging element coupled to the plurality of adjacent layers across the end face to join the plurality of adjacent layers and resist movement of the plurality of adjacent layers relative to one another, the bridging element includes a mechanical feature, the mechanical feature is coupled to the filter material.

26. The filter element of claim 25 wherein the mechanical feature includes a post.

27. The filter element of claim 25 wherein the mechanical feature includes a tab.

28. The filter element of claim 25 wherein the mechanical feature includes a barb.

29. The filter element of claim 25 wherein the bridging element includes a strip of material.

30. The filter element of claim 29 wherein the strip of material is rigid.

31. The filter element of claim 29 wherein strip of material is substantially straight.

32. The filter element of claim 29 wherein the strip of material is substantially curved.

33. The filter element of claim 25 wherein the plurality of adjacent layers include a sheet material and a corrugated material.

34. The filter element of claim 33 wherein the plurality of adjacent layers alternate between the sheet material and the corrugated material.

35. The filter element of claim 25 in combination with a filter housing.

36. A fluid filter element comprising:
a plurality of adjacent layers including a filter material and having an end face, the plurality of adjacent layers form substantially longitudinally oriented flutes that extend axially from a first end to a second end of the filter element; and
a bridging element coupled to the plurality of adjacent layers across the end face to join the plurality of adjacent layers and resist movement of the plurality of adjacent layers relative to one another, the bridging element includes a mechanical feature, the mechanical feature is coupled to the filter material.

37. The filter element of claim 36 wherein the mechanical feature includes a post.

38. The filter element of claim 36 wherein the mechanical feature includes a tab.

39. The filter element of claim 36 wherein the mechanical feature includes a barb.

40. The filter element of claim 36 wherein the bridging element includes a strip of material.

41. The filter element of claim 40 wherein the strip of material is rigid.

42. The filter element of claim 40 wherein strip of material is substantially straight.

43. The filter element of claim 40 wherein the strip of material is substantially curved.

44. The filter element of claim 32 wherein the plurality of adjacent layers include a sheet material and a corrugated material.

45. The filter element of claim 44 wherein the plurality of adjacent layers alternate between the sheet material and the corrugated material.

46. The filter element of claim 36 in combination with a filter housing.

47. A method for improving resistance of a fluid filter element to telescoping, the method comprising: providing a filter element material; arranging the filter element material such that the filter element material comprises a plurality of adjacent layers, the plurality of adjacent layers form substantially longitudinally oriented flutes that extend axially from a first end to a second end of the filter element; providing a bridging element, the bridging element is an adhesive; and coupling the bridging element to an end face of the filter element such that the bridging element joins adjacent ones of the plurality of layers of the filter element to resist movement of adjacent layers relative to one another.

48. The method of claim 47 wherein the adhesive is a bead of adhesive.

49. The method of claim 48 wherein the bead of adhesive includes a strip of material embedded therein.

50. The method of claim 49 wherein the strip of material is a string.

51. The method of claim 47 wherein the plurality of adjacent layers include a sheet material and corrugated material.

52. The method of claim 51 wherein the plurality of adjacent layers alternate between the sheet material and the corrugated material.

53. The method of claim 47 wherein the bridging element extends into the end face.

54. The method of claim 47 in combination with providing a filter housing.

55. A method for improving resistance of a fluid filter element to telescoping, the method comprising: providing a filter element material; arranging the filter element material such that the filter element material comprises a plurality of adjacent layers, the plurality of adjacent layers are arranged in a coil such that the plurality of adjacent layers are concentrically disposed; providing a bridging element; and coupling the bridging element to an end face of the filter element such that the bridging element joins adjacent ones of the plurality of layers of the filter element to resist movement of adjacent layers relative to one another, the bridging element includes a mechanical feature, the mechanical feature is coupled to the filter element material.

56. The method of claim 55 wherein the mechanical feature includes a post.

57. The method of claim 55 wherein the mechanical feature includes a tab.

58. The method of claim 55 wherein the mechanical feature includes a barb.

59. The method of claim 55 wherein the bridging element includes a strip of material.

60. The method of claim 59 wherein the strip of material is rigid.

61. The method of claim 59 wherein the strip of material is substantially straight.

62. The method of claim 59 wherein the strip of material is substantially curved.

63. The method of claim 55 wherein the plurality of adjacent layers include a sheet material and a corrugated material.

64. The method of claim 63 wherein the plurality of adjacent layers alternate between the sheet material and the corrugated material.

65. The method of claim 55 in combination with providing a filter housing.

66. A method for improving resistance of a fluid filter element to telescoping, the method comprising: providing a filter element material; arranging the filter element material such that the filter element material comprises a plurality of adjacent layers, the plurality of adjacent layers form substantially longitudinally oriented flutes that extend axially from a first end to a second end of the filter element; providing a bridging element; and coupling the bridging element to an end face of the filter element such that the bridging element joins adjacent ones of the plurality of layers of the filter element to resist movement of adjacent layers relative to one another, the bridging element includes a mechanical feature, the mechanical feature is coupled to the filter element material.

67. The method of claim 66 wherein the mechanical feature includes a post.

68. The method of claim 66 wherein the mechanical feature includes a tab.

69. The method of claim 66 wherein the mechanical feature includes a barb.

70. The method of claim 66 wherein the bridging element includes a strip of material.

71. The method of claim 70 wherein the strip of material is rigid.

72. The method of claim 70 wherein the strip of material is substantially straight.

73. The method of claim 70 wherein the strip of material is substantially curved.

74. The method of claim 66 wherein the plurality of adjacent layers include a sheet material and a corrugated material.

75. The method of claim 74 wherein the plurality of adjacent layers alternate between the sheet material and the corrugated material.

76. The method of claim 66 in combination with providing a filter housing.

* * * * *